3,605,418
DEPTH CONTROL AND AUTOMATIC SURFACING DEVICE ACTUATED BY AIR DEPLETION IN AIR SUPPLY TANKS
Samuel Levine, Washington, D.C., assignor of fractional part interest to Abraham A. Saffitz, Arlington, Va.
Filed July 30, 1969, Ser. No. 846,183
Int. Cl. B63c *11/22, 11/30*
U.S. Cl. 61—69R      13 Claims

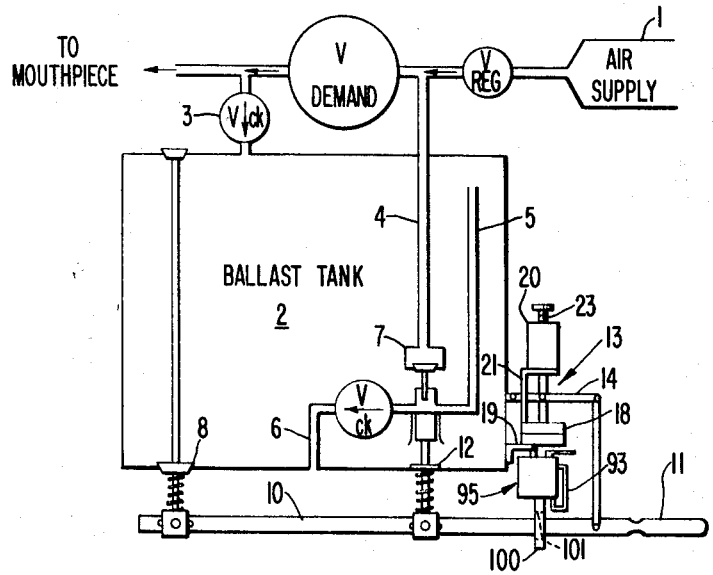
FIG. 1
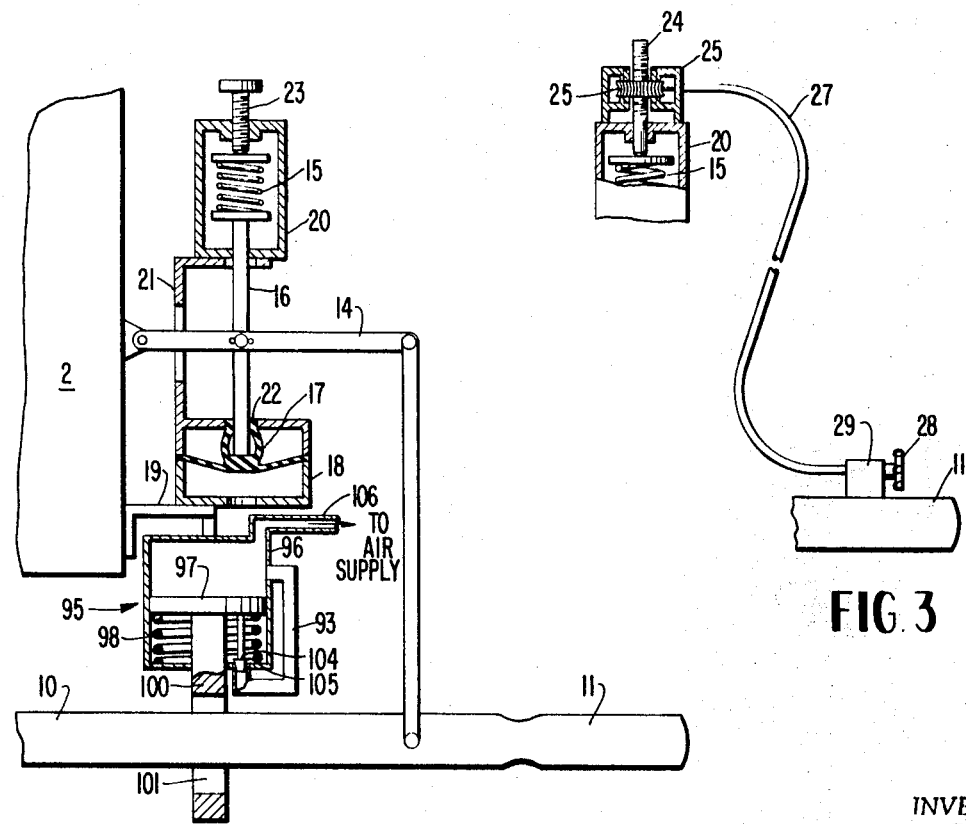
FIG. 2
FIG. 3
INVENTOR
SAMUEL LEVINE
BY Abraham C. Saffitz
ATTORNEY United States Patent Office 3,605,418
Patented Sept. 20, 1971

ABSTRACT OF THE DISCLOSURE

Equipment for swimmers or divers comprising a control to maintain an adjustable constant level of submergence, and further providing a safety feature of forced surfacing of the diver when the breathing air supply gets dangerously low. The level control comprises a ballast tank with means to submerge it to a desired level, and water-depth pressure responsive means to control the ballast in the tank to maintain it at that level. The surfacing means comprises an emergency air tank which carries air under full working pressure and a valve connecting it to the ballast tank. The valve is responsive to the main air supply tank pressure, and when such pressure gets dangerously low, the valve is shifted to a position wherein the emergency air tank is connected to the ballast tank to force the water ballast therefrom and cause surfacing. In another embodiment, a biased piston is latched at an end of a cylindrical portion of the ballast tank. The latching means is responsive to the air pressure of the air supply tank. When the pressure gets dangerously low, the latch means releases the piston which moves under its biasing force to sweep sufficient water from the ballast tank to cause surfacing. The above surfacing means further incorporates timer means to initiate automatic surfacing operation after a selected period of submergence. Alarm means are also provided to indicate the approach of air pressure conditions which initiates surfacing.

---

The present invention relates to auxiliary equipment for swimmers and skin divers, and more particularly to a control system for the ballast tank whereby certain diving control and safety features are attained.

The objects of this invention are:

To maintain the submergence of a swimmer or a diver at a given predetermined constant level.

To provide means to adjust the submergence level to various depths and maintain the level to the adjusted depth.

To provide a safety feature of automatically forced surfacing of the diver when the available breathing air reaches a certain low pressure level in the air supply tank, that is, a pressure insufficient to displace water in the ballast tank.

To attain the above safety feature, an emergency air tank under full working pressure is provided, which tank is connected by a valve means to the ballast tank. The valve means is responsive to the pressure of the main air supply tank and, when such pressure reaches the predetermined low level, it causes the valve to connect the ballast tank to the emergency air tank to permit the air under full working pressure in the air tank to clear or displace the ballast water from the ballast tank and thereby cause the surfacing of the diver.

An alternative structure for the above safety feature is the provision of a ballast tank in the form of a cylinder, or having a portion formed as a cylinder, with a biased piston located at one end of the cylinder. Upon a dangerously low level of air in the main air supply tank, the piston is unlatched and is driven in a direction to displace and discharge the ballast water from the tank with a consequent surfacing of the diver.

A further embodiment provides a predetermined low air pressure responsive means connected to the constant level control lever to actuate it to the surfacing position, regardless of its preset limits.

In addition to, or in place of, the response of the above systems to predetermined low air pressure conditions, timer means are provided to initiate the automatic surfacing after a selected period of submergence.

The above safety systems may be further provided with alarm means to indicate the approach of the point of maximum allowable air depletion.

Other objects and advantages of the invention will become apparent from the following description and the accompanying drawing in which:

FIG. 1 shows the automatic depth control applied to a ballast tank;

FIG. 2 shows a cross-sectional view of the details of the depth control means;

FIG. 3 shows the adjusting means for the depth control means;

FIG. 1 shows an arrangement to maintain the swimmer at a substantially constant level. The constant level control is shown applied to the buoyancy adjusting system disclosed in the patent to Odum et al., No. 3,161,028.

Figure 4:
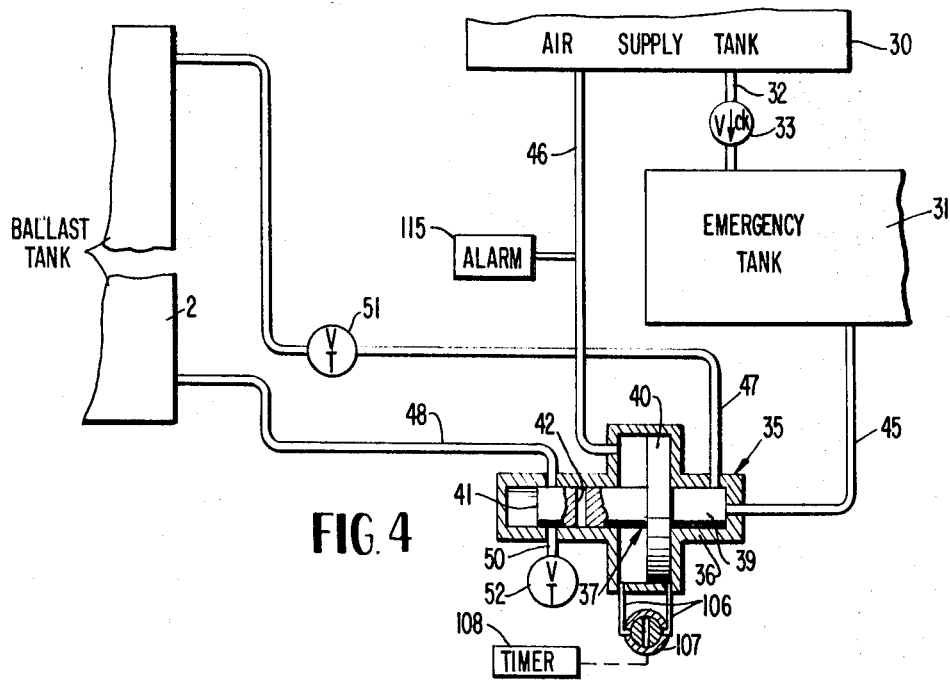
FIG. 4 shows a system for automatic surfacing using stored air to clear the ballast tank.

Briefly, the ballast tank buoyancy control comprises air supply 1 connected to ballast tank 2 by check valve 3 and pipe 4, a stand pipe 5, a sea outlet pipe 6, a control valve 7, a water inlet valve 8 and a control lever 10. Valves 7 and 8 are connected to lever 10. The end of lever 10 forms a handle 11. For a fuller disclosure of the details of the valves, reference is made to the patent to Odum et al. For the practice of this invention, it is sufficient to state that upon the upward movement of handle 11 control valve 7 is actuated to open pipe 4 to the interior of tank 2, to close off stand pipe 5 from sea outlet pipe 6, and to open the tank to the sea at outlet 12, whereby air from the air supply forces the ballast water out of the tank. Valve 8 remains closed during the upward movement of handle 11. Upon downward movement of handle 11, valve 8 opens the top and bottom of tank 2 to admit water into the tank to cause submergence. At that time, control valve 7 closes off air inlet pipe 4, seats outlet 12 and opens communication between pipes 5 and 6.

The control 13 of the present invention is fastened to tank 2 to cooperate with lever 10. Lever 14 is pivoted to tank 2 and is connected by a link to lever 10. The control consists of a setting spring 15, a rod 16 connected to lever 14 and abutting the spring, a water depth sensing diaphragm 17 in casing 18 connected to rod 16, and a depth setting screw 23 to move and adjust the spring.

It should be noted that casing 18 is secured to tank 2 by a bracket 19 and is integral, or rigid, with casing 20 housing the spring 15 by connecting means 21, and that seal portion 22 of diaphragm 17 is bonded to casing 18 to prevent water from seeping in and acting on the diaphragm.

In operation, if the swimmer or diver desires to maintain his location at, for example, 15 feet below the surface, means 23 is turned, either directly or by remote means, the control of which may be located at lever 10, to move spring 15 and rod 16 down. Since rod 16 is fixed to lever 14, lever 14 moves down and thereby moves the link and lever 10 down. As explained above, movement of lever 10 down fills the ballast tank 2 and the swimmer sinks. At approximately the desired level adjustment of means 23 stops. Further down movement increases water pressure on diaphragm 17 to move it and rod 16, lever 14 and lever 10 to neutral position, wherein the ballast tank is cut off from the compressed air and water. As in all control systems, there is a differential range. Spring 15 may be selected to operate on a change of, say, 6 to 8 inches in water level. If, thereafter, the swimmer tends to rise above the set level, the water pressure on diaphragm 17 decreases and spring 15 moves rod 16 and levers 14 and 10 down to admit more water into ballast tank 17. If the swimmer tends to sink below the set level, increased water pressure on diaphragm 17 moves it and rod 16 and levers 14 and 10 up against spring 15, thereby lightening ballast tank 2.

FIG. 3 shows an arrangement for adjusting the desired level at handle 11. Screw 23 is replaced by a screw 24 threaded in nut means 25 positioned on top of casing 20. Screw 24 is rotated to adjust the force on spring 15 by means of worm wheel 25 splined thereto and rotated by a worm connected to a flexible connection 27. The end of connection 27 is secured to a rotating knob member 28 and is supported by bearing block 29 on or adjacent handle portion 11. Thus, the swimmer may either move lever 10 manually or actuate it by rotating knob 28 and thereby move lever 10 through the depth control means 13.

FIG. 4 shows an arrangement for surfacing the swimmer if the air pressure in the supply tank 30 falls to a predetermined low value, a value at which the pressure of the air is insufficient to force the ballast water out of tank 2 at the expected submergence level. An auxiliary emergency tank 31 is connected to tank 30 by pipe 32 and check valve 33. Thus, when tank 30 is filled, tank 31 is also filled with check valve 33 preventing back flow. Thereafter, the air in tank 31 will be maintained under working pressure at all times. Valve 35 comprises a casing 36 and a valve member 37. Valve member 37 has small area end 39, larger piston portion 40 and water control end 41. Through port 42 is located in end 41. Pipe line 45 connects the small end to tank 31. Pipe 46 connects tank 30 to the large piston. Pipe line 47 connects the air end of valve 35 to the top of tank 2, and pipe line 48 connects the bottom of tank 2 to the water end 41 of valve member 37.

In the position shown in FIG. 4, the pressures in tanks 31 and 30 are initially the same and the pressure on the relatively larger area of piston 40 overcomes the pressure of tank 31 acting on smaller area end 39. Therefore, valve member 37 is held in the position shown, with air pipe 45 cut off from air pipe 47 and water pipe 48 cut off from seat-outflow 50. When the pressure in tank 30 falls below a desired chosen value, as determined by the ratio of areas of valve portions 39 and 40, the pressure force acting on 39 from tank 31 overcomes the lower pressure force acting on 40 and the valve is shifted to the left. In the left end position, pipes 45 and 47 are interconnected since pipe 47 is now opened by end 39, and pipe 48 is connected to the sea via passage 42 in the valve member and port 50 in the valve casing. The air in emergency tank 31 under the initial working pressure flows via pipes 45 and 47 to the top of ballast tank 2 to expel the water therefrom through pipe 48 and passages 42–50.

It is well known that sudden and rapid surfacing, even from minor depths, is undesirable and may be injurious to the diver. To regulate the rate of surfacing, an adjustable throttle valve 51 is inserted in pipe 47. Valve 51 controls the rate of air inflow into tank 2 and thereby the rate of ballast water discharge at port 50. Thus, the ascent of the diver is controlled by throttle 51.

If desired, a throttle valve 52 may be used to control the flow of water out of port 50, and thereby the rate of surfacing. Throttle valve 52 may be used alone or jointly with valve 51.

The size of tank 31 is selected so that it is ample to store sufficient air under the necessary pressure to expel sufficient water to bring up the swimmer from the maximum depth. When the pressure in tank 31 falls below the pressure in tank 30, the valve is shifted back by the pressure from tank 30 to cut off port 50 from ballast tank 2 to maintain it buoyant.

Valve 35 may be used with a spring bias for adjusting the pressure ratio and with a detent to maintain it in the extreme positions until the pressure forces "snap" it over. This is a common expedient in the valve art.

Figure 5:
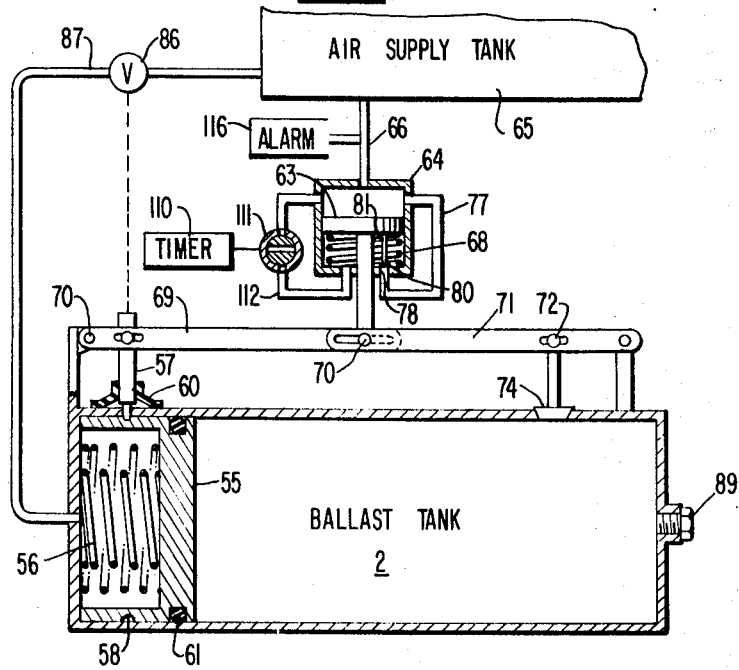
FIG. 5 shows a mechanical system utilizing a biased piston to clear the ballast tank.

FIG. 5 shows another embodiment to surface the swimmer in case of depletion of the supply of air to insure full surfacing. The ballast tank 2 is made in the form of a cylinder and houses piston 55 therein. The piston is biased by nested springs 56 to clear or displace the water, but is retained in the shown position by a latch fitting into an annular groove 58 in the piston. A flexible seal 60 bonded to tank 2 and latch 57 prevents seepage of water behind the piston, and O-ring 61 slidably seals the piston within the cylinder formation. Plunger 63 in housing 64 is responsive to pressure from air supply tank 65 via pipe 66 to hold latch 57 in groove 58 in opposition to the force of springs 68. A link 69, pivoted at 72, connects latch 57 and plunger 63. Another link 71, pivoted at 72, connects plunger 63 to a valve 74 to hold the valve in closed position to prevent communication between ballast tank 2 and the sea.

Housing 64 above plunger 63 is connected by pipe 77 to a port 78 in the bottom of housing 64. A valve 80, connected to an end of a stem 81 secured to plunger 63, seals port 78 when plunger 63 is under the influence of the pressure in tank 65.

When the pressure in tank 65 gets too low to provide a continued ample supply of breathing and surfacing air, the predetermined pressure force on plunger 63 for holding spring 68 compressed and valve 80 closed reaches a value wherein spring 68 overcomes the pressure force on plunger 63 and moves plunger 63 up and attached valve 80 off port 78. The pressure fluid above plunger 63 flows through pipe 77 to act on the bottom face of the plunger, and thereby balances the major portion of the pressure force on the top face. The result is that spring 68 moves plunger 63 up with a snap action and through links 69 and 71 raises latch 57 and valve 74. Springs 56 urge freed piston 55 to the right to force the water from tank 2 out through open valve 74. To prevent vacuum formation behind the moving piston 55, a link 85 connects latch 57 and a normally closed valve 86 in pipe line 87 for joint movement. Thus, as latch 57 moves up, valve 86 is opened to connect air tank 65 to tank 2 behind moving piston 55 to aid piston movement and also prevent vacuum retardation.

To control the rate of surfacing, valve 74 may be of such size as to throttle the outflow of water, or a separable throttle valve, similar to valve 52 of FIG. 4, may be applied to the outflow port of the tank upstream of valve 74.

Plug 89 at the end of tank 2 closes off an opening through which a rod may be inserted to move piston 55 back to its latched position, after it has executed an emergency movement. Instead of a rod, compressed air may be used.

In lieu of springs 58, compressed air may be used to bias piston 55 and valve 86 and pipe 87 may be eliminated.

In lieu of springs 58, compressed air may be used to bias piston 55 and valve 86 and pipe 87 may be eliminated.

With piston 55 in tank 2, it would be necessary to relocate the inside valves 7 and 8 and the pipes outside of the tank, or at least remove these elements from the portion of tank 2 in which piston 55 makes its working movement, that is, only a portion of ballast tank 2 needs to be in cylindrical form to cooperate with piston 55. The portion must be of sufficient volume to clear out sufficient ballast water to cause surfacing of the swimmer or diver.

The automatic surfacing feature may be also applied to buoyancy control lever 10. Referring to FIGS. 1 and 2, a cylinder unit 95, similar to unit 63, 64, etc., of FIG. 5, is secured to tank 2, as by bracket 19, above lever 10. Unit 95 comprises housing 96, plunger 97 biased by a spring 98. Plunger 97 carries a rod 100. Rod 100 has slot 101 through which lever 10 passes. Slot 101 is of sufficient length to permit normal manipulation of lever 10 to control the buoyancy and set level of ballast tank 2, as described above.

Housing 96 has a pipe 103 opening above plunger 97 and connected to the rod end to form a valve seat 104. Valve seat 104 is closed by valve 105 secured to the plunger. Pipe 106 connects the top of housing 96 to air supply 1.

Under normal pressure conditions, plunger 97 is kept in the position shown in FIG. 2, that is, valve 105 closes off its seat 104, slot 101 is in the position to permit full adjusting movements of lever 10 and spring 98 is compressed. The strength of spring 98 is chosen so that it can overcome the maximum setting of spring 15.

As the air is utilized during normal operation, the pressure of air supply 1 is gradually lowered. As it approaches the minimum value at which it is still sufficient to displace ballast water at the selected level for surfacing, spring 98 overcomes the pressure force on plunger 97 and moves the plunger and valve 105 off its seat 104. As soon as seat 104 is opened, pipe 93 connects both faces of plunger 97, thereby balancing the air pressure force thereon, and permitting the full bias of compressed spring 98 to act on plunger 97 and rod 100. The proportions of several elements are such that full movement of plunger 97 takes up the lost motion between the bottom of slot 101 and lever 10 and forces the lever upwardly into its buoyancy increasing position, regardless of the set bias of spring 15. Lever 10 is held in its upward position by rod 100 and plunger 97 under the influence of expanded spring 98 until the diver is fully surfaced.

Instead of automatic surfacing in response to low air pressure, it may be desirable at times to cause surfacing after being submerged for a definite predetermined time period. The period selected may be of such duration as to insure the safe return of the swimmer or diver to the surface.

To carry out the above safe time provision in the embodiment of FIG. 4, both faces of piston 40 are connected by a by-pass connection 106 in which a two-way valve 107 is inserted. In the position shown, valve 107 closes off by-pass 106. A timer 108 of any conventional construction is connected to valve 107. After a selected time period, timer 108 moves valve 107 90° to open by-pass 106 and interconnect both sides of piston 40, and thereby balance the air pressure holding force thereon. The relatively higher pressure force on end 39 shifts valve member 37 to the left to initiate the surfacing operation, as described above.

In FIG. 5, timer 110 controls a two-way valve 111 placed in by-pass 112 across plunger 63. Normally, valve 111 closes off by-pass 112. After a selected time interval, timer 110 moves valve 111 to open by-pass 112, whereby the holding pressure force on plunger 63 is balanced and spring 68 is permitted to actuate the latch, as described above.

If desired, an alarm may be connected to the safety system to give the swimmer or diver a visual, acoustic or other type signal to indicate the approach of air depletion to the danger level. In FIG. 4, an alarm 115 of any conventional construction for giving the desired type signal is connected to pipe 46. Thus, when the pressure in air supply 30 reaches a selected low level, alarm 115 is actuated to give a warning signal. The actuation of the alarm may be arranged to take place before the automatic surfacing operation takes place, or coincidental therewith, so that the diver becomes aware of the surfacing operation and is ready for it.

In FIG. 5 alarm device 116, which is similar to device 115, is connected to pipe 66 to be responsive to the pressure of air supply 65.

In FIGS. 1–3, the diver would become aware of the surfacing operation when he feels the action of spring 98, or feels its resistance when he attempts to move lever 10 downwardly.

Although the invention has been set forth in conjunction with exemplary embodiments thereof, it is to be understood that modifications may be made within its broader spirit and scope as defined in the following claims.

What is claimed is:

1. In a driving system, a ballast tank, an air supply means for breathing and for controlling the buoyancy of said ballast tank, manually operated lever control means to regulate the ballast in the tank for submergence to a given level, and adjustable means connected to said control means and responsive to the water pressure at said level to set and to maintain constant submergence at said level and to change the submergence level to another desired level where it is set, said means which is responsive to the water pressure comprising an adjustable bias means acting on said lever control for setting submergence at a desired level, an element having a differential area means responsive to the water pressure for balancing said bias means, and expansible means responsive to air pressure working to actuate said lever control means to effect surfacing.

2. The diving system of claim 1 wherein said expansible means comprises an expansible chamber device connected to said lever control means, said chamber device being responsive to a predetermined low air pressure of said air supply means to actuate said lever control means, in opposition to the constant level control means, to the position to displace all ballast in the tank and cause surfacing.

3. In a diving system, a ballast tank for submergence, an air supply tank, and emergency means responsive to a predetermined low pressure in said air supply to clear the ballast tank for forced surfacing thereof.

4. The diving system of claim 3, wherein said emergency means comprises an emergency air tank for storing air under sufficient pressure to clear the ballast tank.

5. The diving system of claim 4, comprising communication means between said air tank and said air supply, and check valve means opening in the direction of said air tank into said communication means.

6. The diving system of claim 4, with a valve structure comprising a movable valve member within a casing, means connecting ports in said casing to the interiors of said air tank and ballast tank, a discharge port in said casing, differential area means connected to said valve member and responsive to the pressures of said air supply and of said air tank, the areas being so proportioned that the valve member is held in one position when the presesure of the air supply is above a predetermined minimum, and is shiftable by the pressure of the air tank to a second position when the pressure of the air supply falls below the predetermined minimum, the valve member in the first position closing off the ports in the casing and, when shifted to the second position, connecting the several ports so that the interior of the air tank is connected to the interior of the ballast tank to force the water therein through the discharge port to clear the ballast tank and force surfacing thereof.

7. The diving system of claim 3, wherein said ballast tank is a cylinder and said emergency means comprises a piston slidable in said tank, latch means holding said piston at one end of the tank against biasing means, and means responsive to the predetermined low air supply pressure to release said latch means, said biasing means thereafter moving the piston in the tank to clear the water therein.

8. The diving system of claim 7, comprising a normally closed discharge valve in the ballast tank at a point remote from the latched position of the piston, and means interconnecting said discharge valve and said latch means to open said valve upon the unlatching movement of the latching means.

9. The diving system of claim 4, with a valve structure comprising a movable valve member within a casing, means connecting ports in said casing to the interiors of said air tank and ballast tank, a discharge port in said casing, differential area means connected to said valve member and responsive to the pressures of said air supply and of said air tank, the areas being so proportioned that the valve member is held in one position when the pressure of the air supply is above a predetermined minimum, and is shiftable by the pressure of the air tank to a second position when the pressure of the air supply falls below the predetermined minimum, the valve member in the first position closing off the ports in the casing and, when shifted to the second position, connecting the several ports so that the interior of the air tank is connected to the interior of the ballast tank to force the water therein through the discharge port to clear the ballast tank and force surfacing thereof, a by-pass connecting certain areas of said differential area means, a valve closing the by-pass and timing means connected to said valve to open said by-pass after a predetermined period of submergence to pressure balance the certain areas and cause the shifting of said valve member to its said second position.

10. The diving system of claim 3, wherein said ballast tank is a cylinder and said emergency means comprises a piston slidable in said tank, latch means holding said piston at one end of the tank against biasing means, and means responsive to the predetermined low air supply pressure to release said latch means, said biasing means thereafter moving the piston in the tank to clear the water therein, and timing means to actuate said low air pressure responsive means to its latch releasing position after a predetermined period of submergence.

11. In a diving system, a ballast tank for submergence, an air supply tank for normally controlling the ballast tank, and emergency means responsive to a timing means to clear the ballast tank for forced surfacing after a selected period of submergence determined by said timing means.

12. In a diving system, a ballast tank for submergence, an air supply tank, emergency means responsive to a predetermined low pressure in said air supply to clear the ballast tank for forced surfacing thereof, and an alarm device connected to said air supply and responsive to a predetermined pressure to indicate the approach of said low pressure in the air supply.

13. In a diving system, a ballast tank for submergence, an air supply tank, emergency means responsive to a predetermined low pressure in said air supply to clear the ballast tank for forced surfacing thereof, and valve means to control the rate of clearing the ballast tank and thereby the rate of ascent in surfacing.

References Cited

UNITED STATES PATENTS

| 3,161,028 | 12/1964 | Odum et al. | 61—69R |
| 3,379,023 | 4/1968 | Crose | 61—70 |
| 3,436,776 | 4/1969 | Davis | 114—16E |
| 3,487,647 | 1/1970 | Brecht | 61—69R |

J. KARL BELL, Primary Examiner

U.S. Cl. X.R.

114—16R, 16E

UNITED STATES PATENT OFFICE
CERTIFICATE OF CORRECTION

PATENT NO. : 3,605,418
DATED : September 20, 1971
INVENTOR(S) : SAMUEL LEVINE

It is certified that error appears in the above-identified patent and that said Letters Patent are hereby corrected as shown below:

Claim 1, column 6, line 29, should be corrected to read

---means, and expansible means responsive to a predetermined low air pressure of said air supply means; and---

Claim 1, column 6, line 30, delete "working"

Signed and sealed this 1st day of July 1975.

(SEAL)
Attest:

RUTH C. MASON
Attesting Officer

C. MARSHALL DANN
Commissioner of Patents
and Trademarks